(12) United States Patent
Li et al.

(10) Patent No.: US 11,652,863 B2
(45) Date of Patent: May 16, 2023

(54) METHOD AND APPARATUS FOR CLOUD GAMING

(71) Applicant: TENCENT AMERICA LLC, Palo Alto, CA (US)

(72) Inventors: Guichun Li, Milpitas, CA (US); Xiang Li, Saratoga, CA (US); Xiaozhong Xu, State College, PA (US); Byeongdoo Choi, Palo Alto, CA (US); Shan Liu, San Jose, CA (US)

(*) Notice: Subject to any disclaimer, the term of this patent is extended or adjusted under 35 U.S.C. 154(b) by 186 days.

(21) Appl. No.: 17/176,502

(22) Filed: Feb. 16, 2021

(65) Prior Publication Data

US 2021/0289018 A1 Sep. 16, 2021

Related U.S. Application Data

(60) Provisional application No. 62/990,193, filed on Mar. 16, 2020.

(51) Int. Cl.
| | |
|---|---|
| *H04L 65/70* | (2022.01) |
| *H04L 41/0803* | (2022.01) |
| *H04N 21/434* | (2011.01) |
| *H04N 21/4402* | (2011.01) |
| *H04N 21/478* | (2011.01) |
| *A63F 13/355* | (2014.01) |
| *A63F 13/537* | (2014.01) |
| *G06T 11/00* | (2006.01) |

(Continued)

(52) U.S. Cl.
CPC ............ *H04L 65/70* (2022.05); *A63F 13/26* (2014.09); *A63F 13/27* (2014.09); *A63F 13/28* (2014.09); *A63F 13/335* (2014.09); *A63F 13/355* (2014.09); *A63F 13/537* (2014.09); *G06T 11/00* (2013.01); *H04L 41/0803* (2013.01); *H04N 21/4345* (2013.01); *H04N 21/4402* (2013.01); *H04N 21/4781* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 2015/0296215 A1 | 10/2015 | Callahan | |
| 2018/0288435 A1* | 10/2018 | Boyce | ............. H04N 19/176 |

(Continued)

OTHER PUBLICATIONS

WO Search Report and Written Opinion Issued in Application PCT/US2021/019065 dated May 3, 2021, (12 pages).

(Continued)

*Primary Examiner* — Ronald Laneau
(74) *Attorney, Agent, or Firm* — ArentFox Schiff LLP

(57) ABSTRACT

Aspects of the disclosure provide methods and apparatuses for cloud gaming. In some examples, an apparatus for cloud gaming includes processing circuitry. For example, the processing circuitry receives a video sequence and metadata associated with the video sequence. The video sequence includes a sequence of picture frames generated in response to gaming control information, and the metadata is indicative of the gaming control information. The processing circuitry can configure encoding parameters based on the metadata that is indicative of the gaming control information. Then, the processing circuitry can encode the video sequence into a coded video bitstream, based on the encoding parameters.

20 Claims, 8 Drawing Sheets

(51) Int. Cl.
    *A63F 13/26*     (2014.01)
    *A63F 13/27*     (2014.01)
    *A63F 13/28*     (2014.01)
    *A63F 13/335*     (2014.01)

(56) References Cited

U.S. PATENT DOCUMENTS

| | | |
|---|---|---|
| 2019/0045213 A1 | 2/2019 | Raut et al. |
| 2019/0158704 A1 | 5/2019 | Sines et al. |
| 2019/0379856 A1 | 12/2019 | Hur et al. |
| 2021/0283495 A1* | 9/2021 | Wang ................. A63F 13/24 |
| 2021/0289018 A1* | 9/2021 | Li ................. H04L 41/0803 |

OTHER PUBLICATIONS

Supplementary European Search Report dated Sep. 8, 2022 in Application No. 21771237.1, pp. 1-10.

Shi Shu et al: "Using graphics rendering contexts to enhance the real-time video coding for mobile cloud gaming", ACM 2012 Conference on Computer Supported Cooperative Work Companion, CSCW'12, ACM, USA, Nov. 28, 2011, pp. 103-112.

Liu Yao et al: "Enhancing Video Encoding for Cloud Gaming Using Rendering Information" IEEE Transactions on Circuits and Systems for Video Technology, IEEE, USA, vol. 25, No. 12, Dec. 1, 2015.

* cited by examiner

METHOD AND APPARATUS FOR CLOUD GAMING

INCORPORATION BY REFERENCE

This present disclosure claims the benefit of priority to U.S. Provisional Application No. 62/990,193, "METHOD OF VIDEO CODING IN CLOUD GAMING SYSTEM" filed on Mar. 16, 2020, which is incorporated by reference herein in its entirety.

TECHNICAL FIELD

The present disclosure describes embodiments generally related to multimedia technologies in cloud gaming field.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cloud gaming service is a trending online service which is available from multiple service providers. Cloud gaming may also be referred to as gaming on demand. In a cloud gaming system, games are run on remote servers and are referred to as cloud based games. A user can play a cloud based game via a user device. Gaming contents can be generated at a remove server and are streamed and displayed on the user device.

SUMMARY

Aspects of the disclosure provide methods and apparatuses for cloud gaming. In some examples, an apparatus for cloud gaming includes processing circuitry. For example, the processing circuitry receives a video sequence and metadata associated with the video sequence. The video sequence includes a sequence of picture frames generated in response to gaming control information, and the metadata is indicative of the gaming control information. The processing circuitry can configure encoding parameters based on the metadata that is indicative of the gaming control information. Then, the processing circuitry can encode the video sequence into a coded video bitstream, based on the encoding parameters.

In some embodiments, the metadata includes at least one of camera information, color information, illumination information, motion information, view information, overlay information, and user control information.

In an embodiment, the processing circuitry receives, over a network, a signal carrying user control information. The video sequence is generated in response to the user control information.

In some examples, the processing circuitry determines motion information of at least one of a global motion of a gaming scene, and a local motion of an object in a bounding box within the gaming scene based on gaming scene control information and user control information.

In some embodiments, the processing circuitry determines a motion model for encoding the video sequence based on the metadata that is indicative of the gaming control information. The motion model can be one of an affine model, a perspective model, a rotation model, and a zooming model.

In some examples, the metadata can be transmitted via interface circuitry and a network, to a destination device of the coded video bitstream. In an example, the metadata is transmitted in a supplemental enhancement information (SEI) message along with the coded video bitstream.

In another example, the metadata includes overlay content. The processing circuitry encodes the overlay content into an overlay content bitstream, and multiplexes the coded video bitstream and the overlay content bitstream into an output bitstream. The output bitstream then can be transmitted.

In some other examples, an apparatus for cloud gaming includes processing circuitry that receives a coded video bitstream along with metadata associated with the coded video bitstream. The metadata is indicative of gaming control information. The processing circuitry configures decoding parameters and reconstructing parameters based on the metadata. Then, the processing circuitry decodes the coded video bitstream based on the decoding parameters, and reconstructs a video sequence based on the reconstructing parameters. In an example, the metadata includes overlay content. The processing circuitry de-multiplexing an input bitstream into the coded video bitstream and an overlay content bitstream. The overlay content bitstream is decoded to generate the overlay content. Then, the video sequence can be reconstructed with the overlay content.

Aspects of the disclosure also provide a non-transitory computer-readable medium storing instructions which when executed by a computer for video processing cause the computer to perform the method for cloud gaming.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Aspects of the disclosure provide systems, devices and methods for metadata assisted video coding (encoding/decoding) design in the cloud gaming field.

Figure 1:
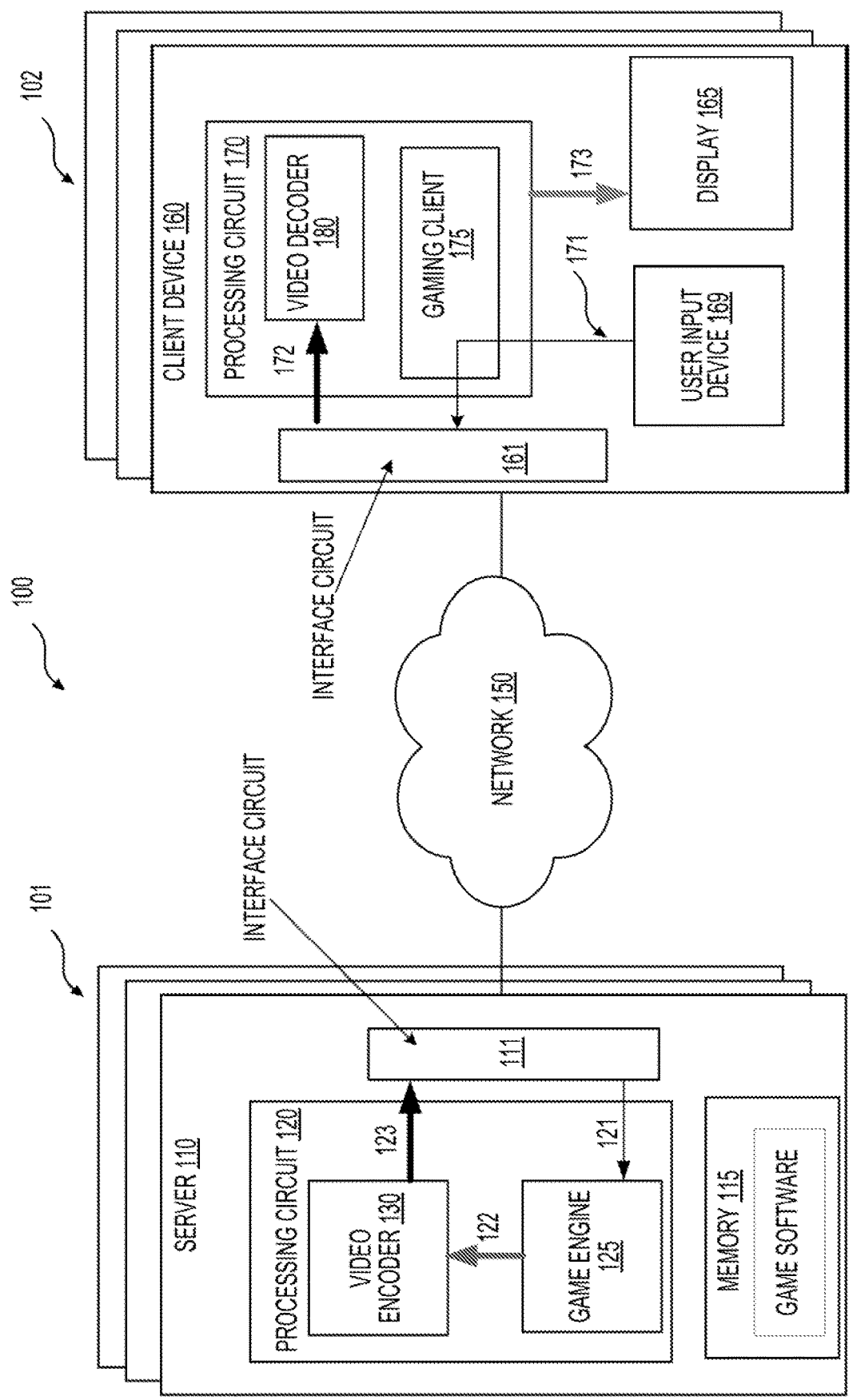
FIG. 1 shows a block diagram of a cloud gaming system according to an embodiment of the disclosure.

FIG. 1 shows a block diagram of a cloud gaming system (100) according to an embodiment of the disclosure. The cloud gaming system (100) includes a server system (101) and a client system (102) that are connected by a network (150). The server system (101) includes one or more servers (110) coupled together. For example, the server system (101) can include data center(s), server farm(s), and the like. The server system (101) can render gaming contents and compress the gaming contents into bitstreams. The bitstreams can be delivered to the client system (102) via the network (150). The client system (102) includes one or more client devices (160) that can respectively interact with game users (also referred to as players). For example, a client device (160) can receive user control information from a game user and can provide outputs, such as video output, audio output to the game user.

The servers (110) can be respectively implemented using any suitable technology. In the FIG. 1 example, a server (110) includes a processing circuit (120), a memory (115), and an interface circuit (111) coupled together. The memory (115) is configured to store software instructions and various data (such as media data, configuration information, control information, and the like) before processing, during processing and after processing.

The processing circuit (120) can include any suitable processing circuitry, such as one or more central processing units (CPUs), one or more graphics processing units (GPUs), application specific integrated circuit, and the like. In the FIG. 1 example, the processing circuit (120) can be configured to include a game engine (125). For example, one or more CPUs and/or GPUs can execute game software stored in the memory (115) to function as the game engine (125). Further, the processing circuit (120) can be configured to include encoders, such as video encoder, audio encoder and the like. In the FIG. 1 example, the processing circuit (120) is configured to include a video encoder (130). For example, one or more CPUs and/or GPUs can be configured to function as the video encoder (130). In another example, the video encoder (130) can be implemented using application specific integrated circuits.

The interface circuit (111) can interface the server (110) with the network (150). The interface circuit (111) can include a receiving portion that receives signals from the network (150) and a transmitting portion that transmits signals to the network (150). For example, the interface circuit (111) can transmit signals that carry encoded media data, such as a coded video bitstream, a coded audio bitstream and the like to other devices, such the client devices (160), via the network (150). The interface circuit (111) can receive signals that carry user information, such as user inputs, and the like, from the client devices (160) via the network (150).

The network (150) is suitably coupled with the server system (101) and the client system (102) via wired and/or wireless connections, such as Ethernet connections, fiber-optic connections, WiFi connections, cellular network connections and the like. The network (150) can include network server devices, storage devices, network devices and the like. The components of the network (150) are suitably coupled together via wired and/or wireless connections.

The client devices (160) are configured to interact with users. In the FIG. 1 example, a client device (160) includes various components, such as an interface circuit (161), a processing circuit (170), a display (165), and a user input device (169) coupled together.

The interface circuit (161) can interface the client device (160) with the network (150). The interface circuit (161) can include a receiving portion that receives signals from the network (150) and a transmitting portion that transmits signals to the network (150). For example, the interface circuit (161) can receive signals carrying data, such as signals carrying a coded video bitstream, signals carrying audio bitstream and the like that are sent by the server (110), from the network (150), and can transmit signals, such as signals carrying user inputs and the like, to other devices, such as the server (110) via the network (150).

The user input device (169) can receive user inputs, and the user inputs can be suitable sent to the server system (101). In an example, the user inputs can be provided to the processing circuit (170), and the processing circuit (170) can convert the user inputs into a suitable form, such as a message, a packet, and the like and send the user inputs via the interface circuit (161). The user inputs can be sent to the server system (101) via the network (150). The user input device (169) can be any suitable user input device, such as a joystick, a motion sensor, a microphone, a keyboard, a mouse, a touch screen, a touch pad, and the like.

The processing circuit (170) can include suitable processing circuitry, such as CPU, GPU, application specific integrated circuits and the like. The processing circuit (170) can be configured to include media decoder(s), such video decoder, audio decoder, and the like. For example, the processing circuit (170) is configured to include a video decoder (180). In an example, a GPU is configured as the video decoder (180). In another example, a CPU can execute software instructions to function as the video decoder (180). The video decoder (180) can decode information in a coded video bitstream and reconstruct a video sequence (e.g., a sequence of picture frames).

Further, the processing circuit (170) can be configured to include a gaming client (175). For example, a CPU can execute a cloud gaming client software to function as the gaming client (175). The gaming client (175) can receive user inputs (171) and send data representing the user inputs (171) to the game engine (125) in the server (110).

The display (165) can be any suitable display device, such as a television, a smart phone, a wearable display, a head-mounted device, and the like. In an example, the display (165) can receive a video sequence and suitably display the video sequence.

In some examples, to play a game, the game engine (125) can generate game contents for the game, such as a video sequence, an audio, and the like that depict various gaming environments of the game. In an example, the game engine (125) can generate video contents (122) (e.g., video sequences), and provide the video contents (122) to the video encoder (130). The video encoder (130) can compress the video contents (122) into a coded video bitstream (123), and the coded video bitstream (123) can be transmitted by the interface circuit (111) and streamed to the client device (160) via the network (150). At the client device (160), the interface circuit (161) can receive signals carrying a coded video bitstream, and provide the coded video bitstream (172) to the video decoder (180). The video decoder (180) can reconstruct a video sequence from the coded video bitstream (172), and the reconstructed video sequence (173) can be provided to the display (165) to provide the gaming environment to a game user.

The game user can interact with the gaming client (175). For example, the gaming client (175) can receive user control information (also referred to as interaction data in some examples), such as user inputs (171) shown in FIG. 1. The user control information, such as commands, location information, depth information, movement information and the like, can be transmitted from the gaming client (175) to the game engine (125) (the user control information is shown by (121) at the server (110)) via the interface circuit (161), the network (150) and the interface circuit (111). Then, in response to the received user control information (121), the game engine (130) can perform operations and generate updated game contents. The updated game contents can be compressed and provided from the server (110) to the client device (160). As the game continues, the gaming process repeats.

In some embodiments, the game engine (125) can generate gaming video content in the form of raw video contents (122), such as a sequence of picture frames in YUV formats. The raw video contents (122) can be provided to the video encoder (130). The video encoder (130) compresses the raw video contents, and generates a coded video bitstream (123) following a certain video coding format or standard, such as H.264, H.265, AV1, AVS2, etc. This coded video bitstream (123) is sent to the client devices (160) and can be decoded by the video decoders on the client side for display, using the conforming format or standard as the video encoder (130).

The cloud gaming system (100) provides a way to play video games by running the game software on a remote server, as opposed to on a game console or other local device in related examples. For example, a game company owns the servers (110) that are dedicated servers for game streaming, and the servers (110) can be significantly more powerful than consumer-end hardware (e.g., client devices). Further, in some examples, a streaming service can send similar data to multiple client devices (160) that are playing the same game by multiple players (users). Thus, the multiple players can play the same game for less than a total amount of operating cost (to the game company) than what would be expected in the related examples, where the costs are proportional to the number of players.

Figure 2:
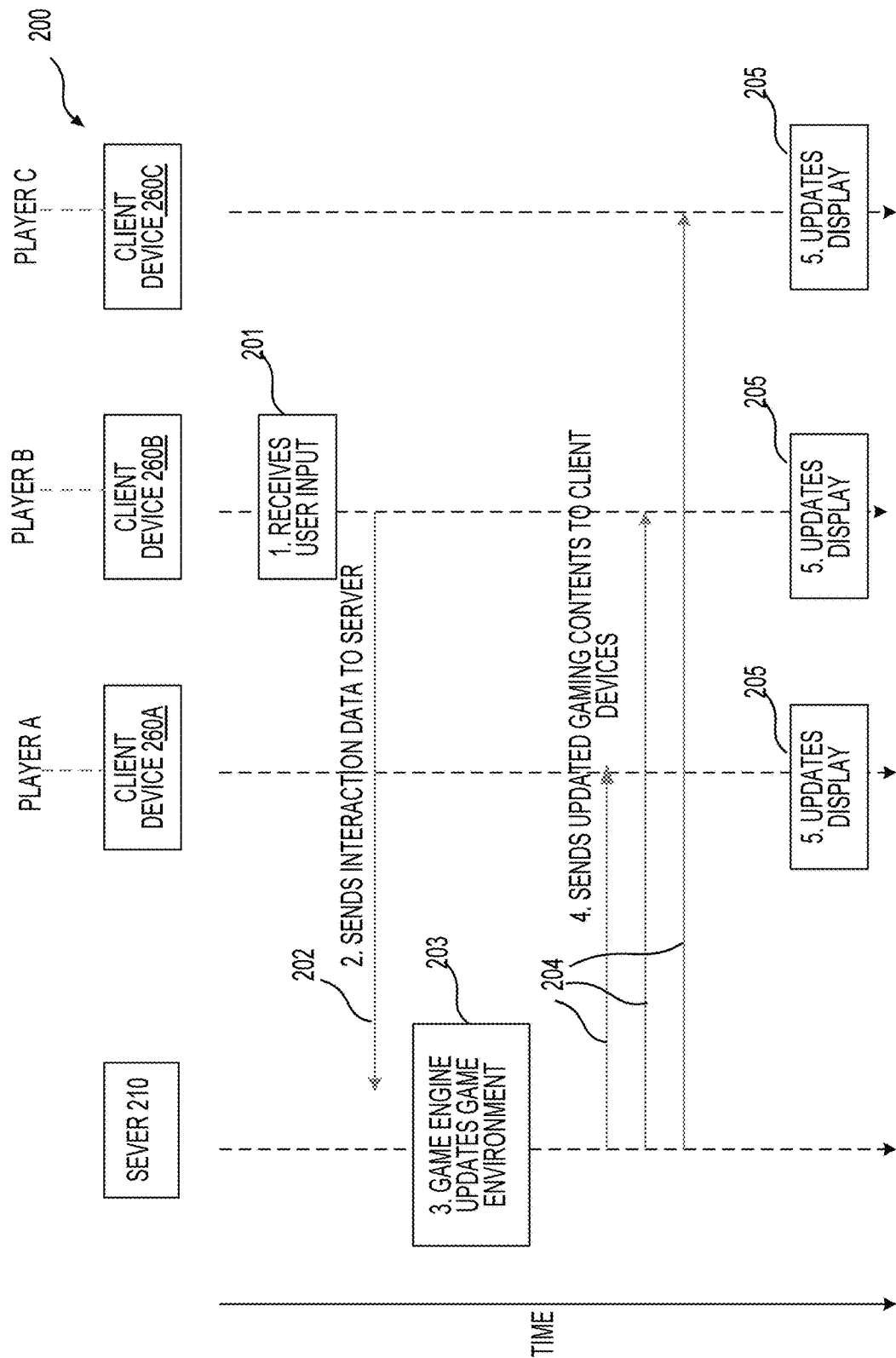
FIG. 2 shows a diagram illustrating a cloud gaming scenario according to some embodiments of the disclosure.

FIG. 2 shows a diagram (200) illustrating a cloud gaming scenario according to some embodiments of the disclosure. In the FIG. 2 example, a server (210) is a cloud gaming server that provides gaming service for a game, and client devices 260A-260C are client devices that respectively interact with players A-C of the game. The server (210) can be configured similarly as the server (110) in FIG. 1. The client devices 260A-260C can be respectively configured similarly to the client device (160) in FIG. 1.

In the FIG. 2 example, a game engine (not shown) in the server (210) renders gaming contents for gaming environment and provide the gaming contents to the client devices (260A)-(260C) via a network (not shown). At a time, shown as (201) in FIG. 2, the client device (260B) receives user control information, such as user inputs from player B. Shown as (202) in FIG. 2, the client device 260B sends data representing the user inputs to the server (210) via the network. In response to the data representing the user inputs, shown as (203) in FIG. 2, the game engine in the server (210) operates and updates the gaming environment. Then, shown as (204) in FIG. 2, the server (210) sends updated gaming contents to the client devices (260A)-(260C). At the client side, shown as (205) in FIG. 2, each of the client devices (260A)-(260C) can refresh the gaming environment, such as refresh the display, in response to the updated gaming contents.

In a related example, client devices can be gaming consoles or PCs that are required to play most games and constitute a large upfront cost for gaming. The gaming consoles or PCs can cost from hundreds to thousands of dollars. Local machines (gaming consoles or PCs) also wear overtime and have decreased performance. Cloud gaming servers are continuously upgraded as technology develops at no extra cost to the consumers.

According to some aspects of the disclosure, cloud gaming may require high and reliable bandwidth requirement and low latency for two-way communication requires in order to achieve good user experience. In some examples, cloud gaming may require both a fast and stable Internet connection as well as close proximity to the game servers in order to have high and reliable bandwidth. For example, the streaming services for cloud gaming may require bandwidth between 10 Mbps to 35 Mbps. The present disclosure provides techniques to improve coding speed and coding efficiency in order to reduce the bandwidth requirement and to improve visual quality as well.

In some examples, high latency can be detrimental to a gaming experience. Latency can be contributed by many factors, and video encoding for the streaming is one of the factors. The present disclosure also provides techniques to reduce encoding time while maintain the coding efficiency, and thus improve cloud gaming experience.

Aspects of the disclosure provide techniques for metadata assisted video encoding design in cloud gaming systems. In some examples, metadata for video contents (e.g., raw video) refers to data that provides information about video contents, such as camera information, color information, illumination information, motion information, view information, user control, and the like. The metadata along with the raw video can be rendered by a game engine (e.g., the game (125)), and may also be provided by the game engine as input to a video encoder (e.g., the video encoder (130)), in order to assist the encoding process. In some embodiments, the video encoder (e.g., the video encoder (130)) can encode the raw video into a coded video bitstream with the assistance of the metadata. Further, in some embodiments, the metadata can be provided to a video decoder (e.g., the video decoder (180)) along with the coded video bitstream. The video decoder (e.g., the video decoder (180)) can decode the coded video bitstream with the assistance of the metadata.

Figure 3:
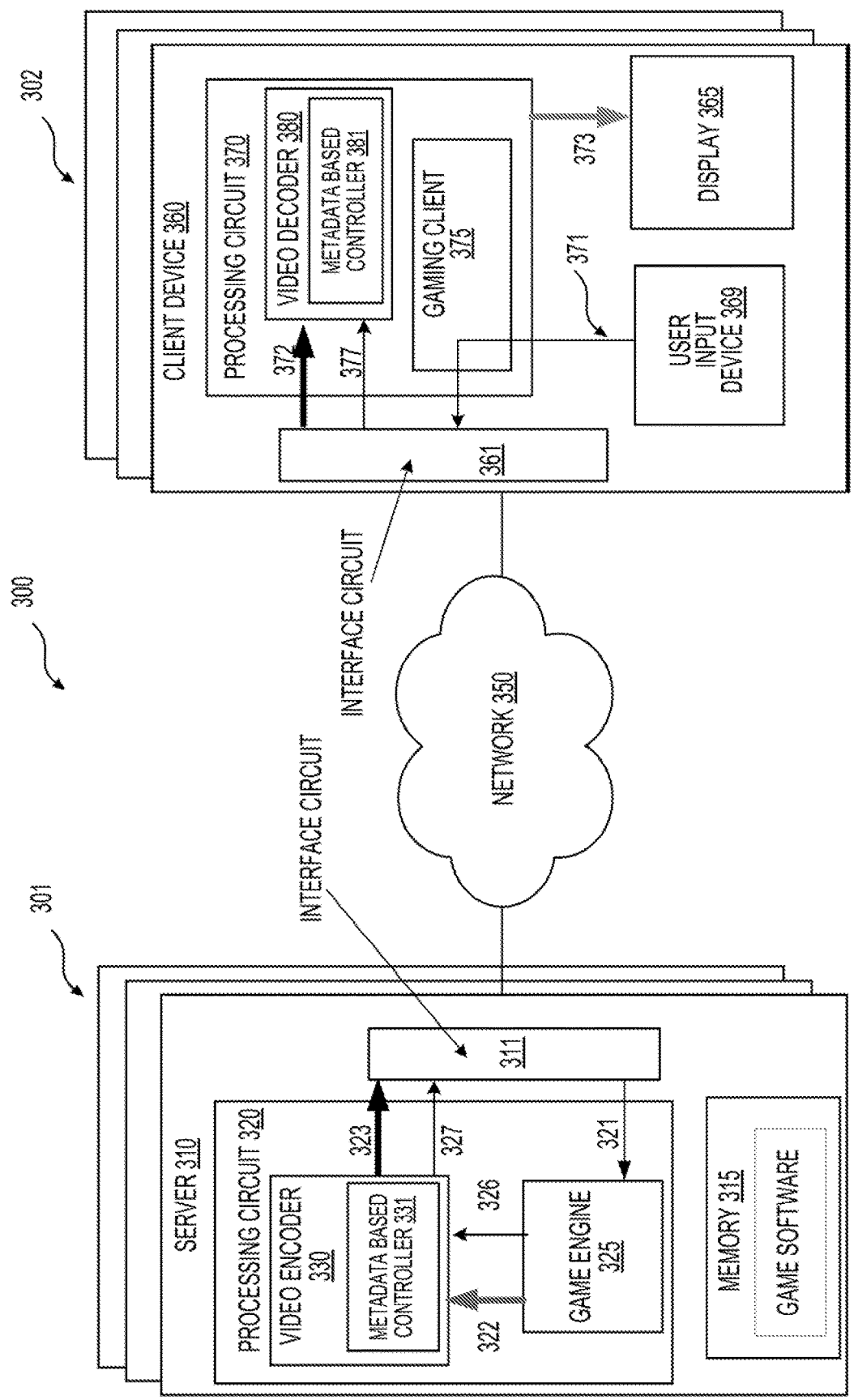
FIG. 3 shows a block diagram of a cloud gaming system according to some embodiments of the disclosure.

FIG. 3 shows a block diagram of a cloud gaming system (300) according to some embodiments of the disclosure. The cloud gaming system (300) operates similarly to the cloud gaming system (100) described above and utilizes certain components that are identical or equivalent to those used in the cloud gaming system (100). For example, a server system (301) is similarly configured as the server system (101); a client system (302) is similarly configured as the client system (102); a network (350) is similarly configured as the network (150); a server (310) is similarly configured as the server (110); a processing circuit (320) is similarly configured as the processing circuit (120); a memory (315) is similarly configured as the memory (115); an interface circuit (311) is similarly configured as the interface circuit (111); a game engine (325) is similarly configured as the game engine (125); a video encoder (330) is similarly configured as the video encoder (130); an interface circuit (361) is similarly configured as the interface circuit (161); a processing circuit (370) is similarly configured as the processing circuit (170); a display 365 is similarly configured as the display (165); a user input device 369 is similarly configured as the user input device (169); a gaming client (375) is similarly configured as the gaming client (175); a video decoder (380) is similarly configured as the video decoder (180). The description of these components has been provided above and will be omitted here for clarity purposes.

Further, in the FIG. 3 example, the video encoder (330) is configured to encode video contents into video bitstream with assistance of metadata. For example, the video encoder (330) includes a controller (331) that is a metadata based controller. The game engine (325) provides raw video contents (322) along with metadata (326) to the video encoder (330). The metadata (326) includes information associated with the raw video contents (322), such as camera information, color information, illumination information, motion information, view information, user control, associated with the raw video contents (322). The controller (331) receives the metadata (326) and controls configurations of the video encoder (330) based on the metadata (326) to encode the raw video contents (322) and generate coded video bitstream (323). The assistance of metadata improves encoding speed and efficiency, and can reduce bandwidth requirement and reduce latency.

In some embodiments, the coded video bitstream (323) can be output with metadata, such as shown by metadata output (327).

Further, in the FIG. 3 example, the video decoder (380) is configured to decode video bitstream with assistance of metadata. For example, the video decoder (380) includes a controller (381) that is metadata based controller. The controller (381) receives metadata (377) along with a coded video bitstream (372). In an example, the coded video bitstream (372) can be the coded video bitstream (323) generated by the video encoder (330), and the metadata (377) can be the metadata output (327). The controller (381) can control configuration of the video decoder (380) based on the metadata (377) to decode the coded video bitstream (372), and generate the reconstructed video sequence (373).

In some embodiments, the metadata (326) from the game engine (325) to the video encoder (330) may contain any suitable gaming control information, such as gaming scene information (e.g., camera information, color information, illumination information, motion information, view information), user control information, and the like that can help improve coding efficiency and/or reduce complexity of the encoding process.

Specifically, in some examples, user inputs (371) (also referred to as user control information) from the user input device (369), such as a joystick, keypad, mouse, and/or keyboard, can be transmitted from the client device (360) to the server (310). In an example, the game engine (325) receives user control information (321) which corresponds to the user inputs (371) at the client device (360). The game engine (325) can generate game scene contents (such as video contents, audio contents and the like) based on the user control information (321). In some embodiments, metadata (326) can be determined based on the game scene information and the user control information (321). For example, a global motion of the game scene and/or a local motion of an object can be identified based on the game scene information and the user control information (321). In an example, the user control information (321) includes a viewing direction change, thus a global motion of the gaming scene can be identified based on the viewing direction change. In another example, the user control information (321) includes a moving of an object, thus a local motion of the object can be identified. In an example, the metadata (326) can include the global motion of the gaming scene, the local motion of the object and a bounding box of the object. The metadata (326) may help a video encoding process as additional input data to the video encoder (330). The metadata (326) can be fed to the video encoder (330) along with the raw video contents (322) rendered by the gaming engine (325). The video encoder (330) may utilize the information in the metadata (326) to efficiently carry out the motion estimation/compensation process with the raw video contents (322).

In some embodiments, the metadata (326) may be fed to the video encoder (330) as configurable encoder settings, such as parameters of the video encoder (330), and the like. In an example, the metadata (326) may be used to generate global motion model (e.g. affine model, perspective model, rotation model, zooming model, etc.) of a picture or regions of a picture. In another example, the metadata (326) may be used to select an encoding tool in the video encoder (330). However, in an example, when any of such parameters are not available, a default set of values can be assumed by the video encoder (330).

In some embodiments, the metadata (326) fed into the video encoder (330) may be processed and sent shown by metadata (327) along with the coded video bitstream (323). The metadata (327) can assist a video decoder to decode a coded video bitstream (323). For example, the metadata (327) that may assist decoding and display of the coded video bitstream (323), such as timing information, overlay messages, overlay graphics, bounding box, and the like can be sent as supplemental enhancement information (SEI) messages. The SEI messages can be conveyed within the coded video bitstream or separately.

In some embodiments, the client device (360) receives a coded video bitstream (372) along with metadata (377). The metadata (377) may be used by the client device (360) to assist the decoding or post-processing of the video sequence carried in the coded video bitstream (372). For example, the metadata (377) may include timing information, overlay messages, overlay graphics, bounding box information that may assist decoding and display of the coded video bitstream (372).

In some embodiments, the metadata can be coded (encoded/decoded) using additional codec. In some examples, the game engine (325) may output separated contents, video, audio, overlay messages, overlay graphics, and the like. In an example, the overlay messages (or the overlay graphics) are considered as metadata for the video contents. The overlay messages (or the overlay graphics) can be compressed into a separate bitstream (a second bitstream) using a separate encoder from the video encoder 330. Then, the coded video bitstream for the video content and the second bitstream for the overlay message (or the overlay graphics) may be multiplexed into a single bitstream in an example.

Figure 4:
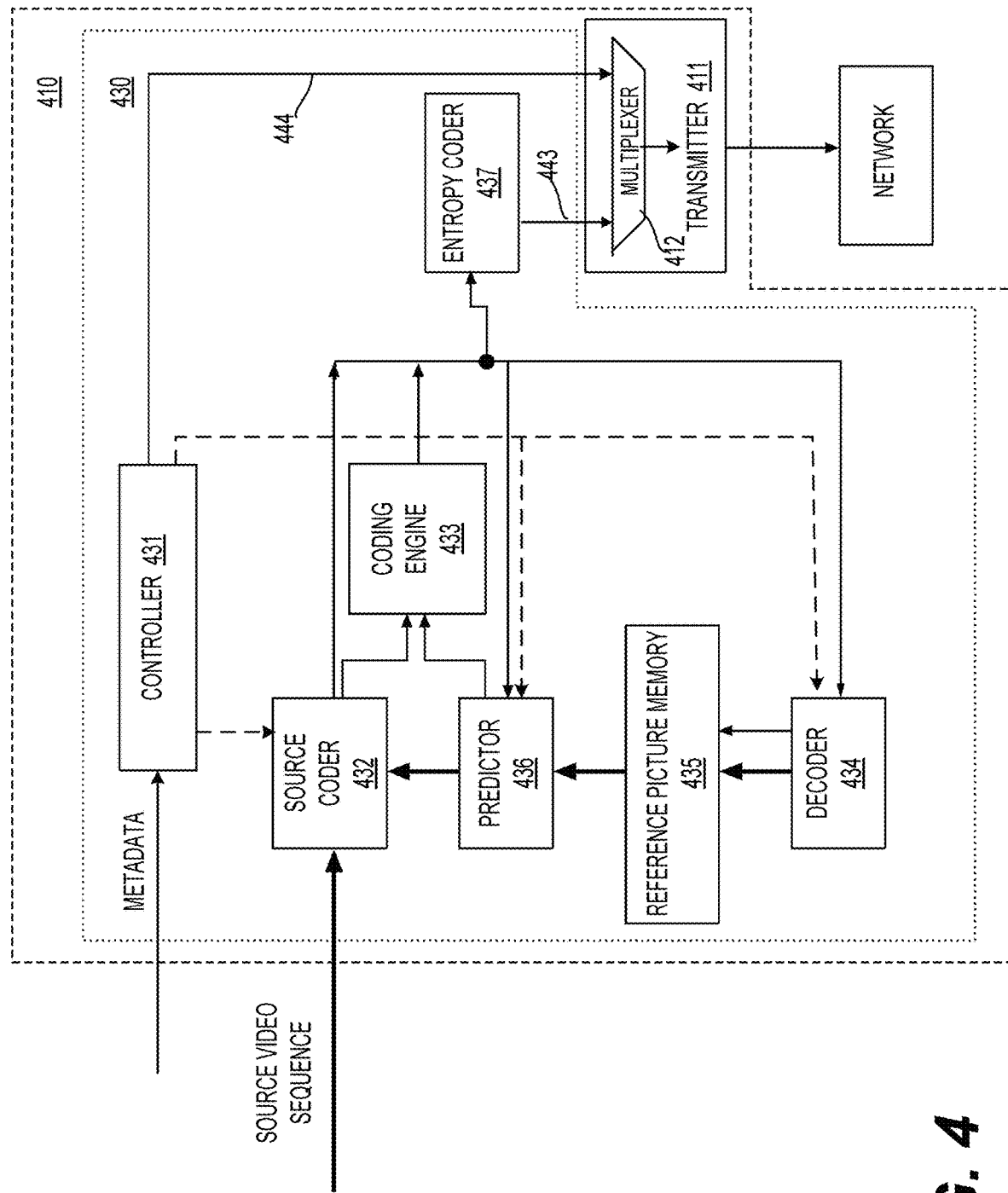
FIG. 4 shows a block diagram of a video encoder according to an embodiment of the present disclosure.

FIG. 4 shows a block diagram of a video encoder (430) according to an embodiment of the present disclosure. The video encoder (430) is included in an electronic device (410). In an example, the electronic device (410) is a server device, such as the server (310) in FIG. 3 example. The electronic device (410) also includes a transmitter (411) (e.g., transmitting circuitry and the like). The video encoder (430) can be used in the place of the video encoder (330) in the FIG. 3 example.

The video encoder (430) may receive raw video contents from a video source, such as the gaming engine (325) in the FIG. 3 example. In addition, the video encoder (430) can receive metadata, such as camera information, color information, illumination information, motion information, view information, overlay information (e.g., overlay messages, overlay graphics and the like), user control, and the like, that provides information associated with the raw video contents.

In some examples, the raw video contents are in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). The raw video contents may be provided as a plurality of individual pictures that impart motion when viewed in sequence. The pictures themselves may be organized as a spatial array of pixels, wherein each pixel can comprise one or more samples depending on the sampling structure, color space, etc. in use.

According to an embodiment, the video encoder (430) may code and compress the pictures of the raw video contents (also referred to as a video sequence), into a coded video bitstream (443). In the FIG. 4 example, the video encoder (430) includes a controller (431) that is configured to control encoding configurations of the video encoder (430) based on metadata in order to improve encoding speed and efficiency. In some embodiments, the controller (431) controls other functional units as described below and is functionally coupled to the other functional units. The coupling is not depicted for clarity. It is noted that the controller (431) can set various parameters, such as picture skip, quantizer, lambda value of rate-distortion optimization techniques, picture size, group of pictures (GOP) layout, maximum motion vector search range, motion models and so forth.

In an example, the controller (431) is configured to determine a global motion model, such as affine model, perspective model, rotation model, zooming model and the like of a picture based on the metadata, and can configure encoding parameter accordingly. In another example, the controller (431) is configured to determine a region in a bounding box within a picture and a local motion model of the region based on the metadata. In some embodiments, the controller (431) includes a separate encoder (not shown) from other portion of the video encoder (430). The separate encoder can compress the metadata into compressed metadata. For example, the metadata includes overlay contents, such overlay messages and overlay graphics. The overlay contents can be compressed into an overlay content bitstream (444). In an example, the overlay content bitstream (444) can be combined with the coded video bitstream (443) into a single bitstream, for example, by a multiplexer (412). In another example, the controller 431 can include the metadata into a SEI message that is associated with the coded video bitstream (443). The controller (431) can be configured to have other suitable functions that pertain to the video encoder (430) optimized for a certain system design.

In some embodiments, the video encoder (430) is configured to operate in a coding loop. As an oversimplified description, in an example, the coding loop can include a source coder (432) (e.g., responsible for creating symbols, such as a symbol stream, based on an input picture to be coded, and a reference picture(s)), and a (local) decoder (434) embedded in the video encoder (430). The decoder (434) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (435). As the decoding of a symbol stream leads to bit-exact results independent of decoder location (local or remote), the content in the reference picture memory (435) is also bit exact between the local decoder and remote decoder. In other words, the prediction part of an encoder "sees" as reference picture samples exactly the same sample values as a decoder would "see" when using prediction during decoding.

The operation of the "local" decoder (434) can be the same as of a "remote" decoder, that will be described in detail in conjunction with FIG. 5.

During operation, in some examples, the source coder (432) may perform motion compensated predictive coding, which codes an input picture predictively with reference to one or more previously coded picture from the video sequence that were designated as "reference pictures." In this manner, the coding engine (433) codes differences between pixel blocks of an input picture and pixel blocks of reference picture(s) that may be selected as prediction reference(s) to the input picture. In some examples, the source coder (432) can receive control signals from the controller (431). The control signals are generated based on metadata of the video sequence and can control the source coder (432) to perform the motion compensated predictive coding with fast speed.

The local video decoder (434) may decode coded video data of pictures that may be designated as reference pictures, based on symbols created by the source coder (432). Operations of the coding engine (433) may advantageously be lossy processes. When the coded video data may be decoded at a video decoder (such as the video decoder that will be described with reference to FIG. 5), the reconstructed video sequence typically may be a replica of the source video sequence with some errors. The local video decoder (434) replicates decoding processes that may be performed by the video decoder on reference pictures and may cause reconstructed reference pictures to be stored in the reference picture cache (435). In this manner, the video encoder (430) may store copies of reconstructed reference pictures locally that have common content as the reconstructed reference pictures that will be obtained by a far-end video decoder (absent transmission errors).

The predictor (436) may perform prediction searches for the coding engine (433). That is, for a new picture to be coded, the predictor (436) may search the reference picture memory (435) for sample data (as candidate reference pixel blocks). In some examples, the predictor (436) receives control signals from the controller (431). The control signals can be generated based on metadata, camera information, color information, illumination information, motion information, view information, user control, block shapes, and the like. The control signals can control the predictor (436) to reduce the time for prediction searches of appropriate prediction reference for the new pictures. In an example, the control signals can indicate reference (e.g., reference picture, reference block, and the like). In another example, the control signals can indicate a starting point for the search. The predictor (436) may operate on a sample block-by-pixel block basis to find appropriate prediction references. In some cases, as determined by search results obtained by the predictor (436), an input picture may have prediction references drawn from multiple reference pictures stored in the reference picture memory (435).

The controller (431) may also manage coding operations of the source coder (432), including, for example, setting of parameters and subgroup parameters used for encoding the video data.

Output of all aforementioned functional units may be subjected to entropy coding in the entropy coder (437). The entropy coder (437) translates the symbols as generated by the various functional units into a coded video sequence, by lossless compressing the symbols according to technologies such as Huffman coding, variable length coding, arithmetic coding, and so forth.

The transmitter (411) may buffer the coded video sequence(s) as created by the entropy coder (437) to prepare for transmission via a network. The transmitter (411) may merge coded video data from the video coder (430) with other data to be transmitted, for example, coded audio data and/or ancillary data streams (sources not shown). In some examples, the coded video bitstream (443) and the overlay content bitstream (444) are multiplexed into a single bitstream. In another example, metadata may be included into an SEI message associated with the coded video bitstream (443).

The controller (431) may perform various manage operations of the video encoder (430). During coding, the controller (431) may assign to each coded picture a certain coded picture type, which may affect the coding techniques that may be applied to the respective picture. For example, pictures often may be assigned as one of the picture types, such as I picture, P picture, B picture and the like.

An Intra Picture (I picture) may be one that may be coded and decoded without using any other picture in the sequence as a source of prediction. Some video codecs allow for different types of intra pictures, including, for example Independent Decoder Refresh ("IDR") Pictures.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (430) may perform coding operations according to a predetermined video coding technology or standard. In its operation, the video encoder (430) may perform various compression operations, including predictive coding operations that exploit temporal and spatial redundancies in the input video sequence. The coded video data, therefore, may conform to a syntax specified by the video coding technology or standard being used.

In an embodiment, the transmitter (411) may transmit additional data with the encoded video. The source coder (432) may include such data as part of the coded video sequence. Additional data may comprise temporal/spatial/SNR enhancement layers, other forms of redundant data such as redundant pictures and slices, SEI messages, VUI parameter set fragments, and so on.

A video (or video sequence, raw video contents) may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the high efficiency video coding (HEVC) standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
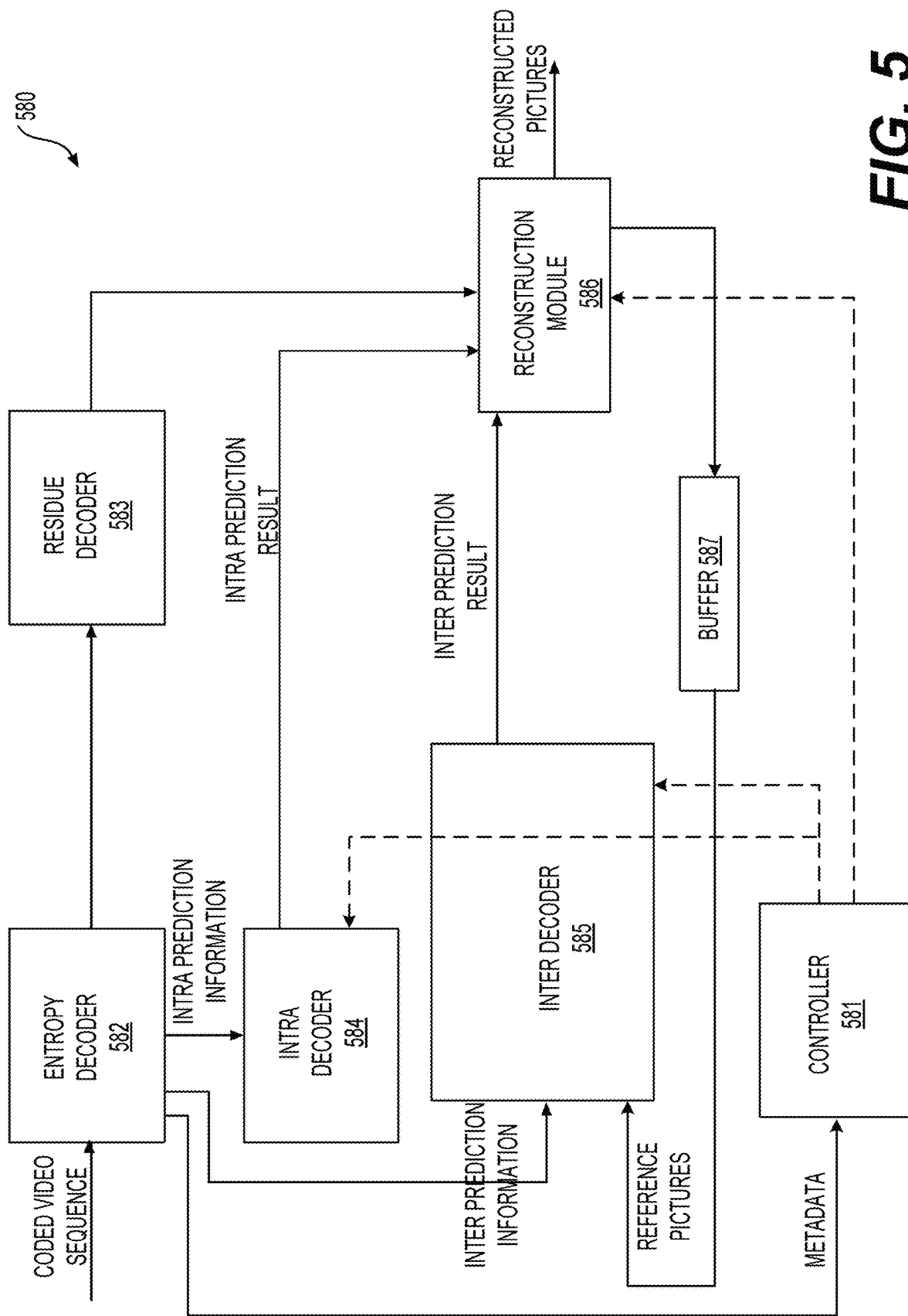
FIG. 5 shows a diagram of a video decoder according to some embodiments of the disclosure.

FIG. 5 shows a diagram of a video decoder (580) according to some embodiments of the disclosure. The video decoder (580) is configured to receive coded pictures that are part of a coded video sequence, and decode the coded pictures to generate reconstructed pictures. In an example, the video decoder (580) is used in the place of the video decoder (380) in the FIG. 3 example.

In the FIG. 5 example, the video decoder (580) includes an entropy decoder (582), an inter decoder (585), a residue decoder (583), a reconstruction module (586), and an intra decoder (584) coupled together as shown in FIG. 5.

The entropy decoder (582) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (584) or the inter decoder (585), respectively, residual information in the form of, for example, quantized transform coefficients, and the like. In an example, when the prediction mode is inter or bi-predicted mode, the inter prediction information is provided to the inter decoder (585); and when the prediction type is the intra prediction type, the intra prediction information is provided to the intra decoder (584). The residual information can be subject to inverse quantization and is provided to the residue decoder (583). The metadata can be provided to a controller (581).

The inter decoder (585) is configured to receive the inter prediction information, and generate inter prediction results based on the inter prediction information.

The intra decoder (584) is configured to receive the intra prediction information, and generate prediction results based on the intra prediction information.

The residue decoder (583) is configured to perform inverse quantization to extract de-quantized transform coefficients, and process the de-quantized transform coefficients to convert the residual from the frequency domain to the spatial domain. The residue decoder (583) may also require certain control information (to include the Quantizer Parameter (QP)), and that information may be provided by the entropy decoder (582) (data path not depicted as this may be low volume control information only).

The reconstruction module (586) is configured to combine, in the spatial domain, the residual as output by the residue decoder (583) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality. The reconstructed pictures can be buffered, for example, in a buffer (587) and the buffer (587) can provide reference pictures to the inter decoder (585).

In some embodiments, the controller (581) receives metadata and can configure decoding parameters of the decoder (580) based on the metadata. In some examples, the controller (581) can provide control signals to the intra decoder (584) and/or the inter decoder (585) to control prediction based on the metadata. In another example, the controller (581) can decode overlay contents from the metadata, and provide overlay contents to the reconstruction module (586). Thus, the reconstruction module (586) can reconstruct pictures with the overlay contents.

Figure 6:
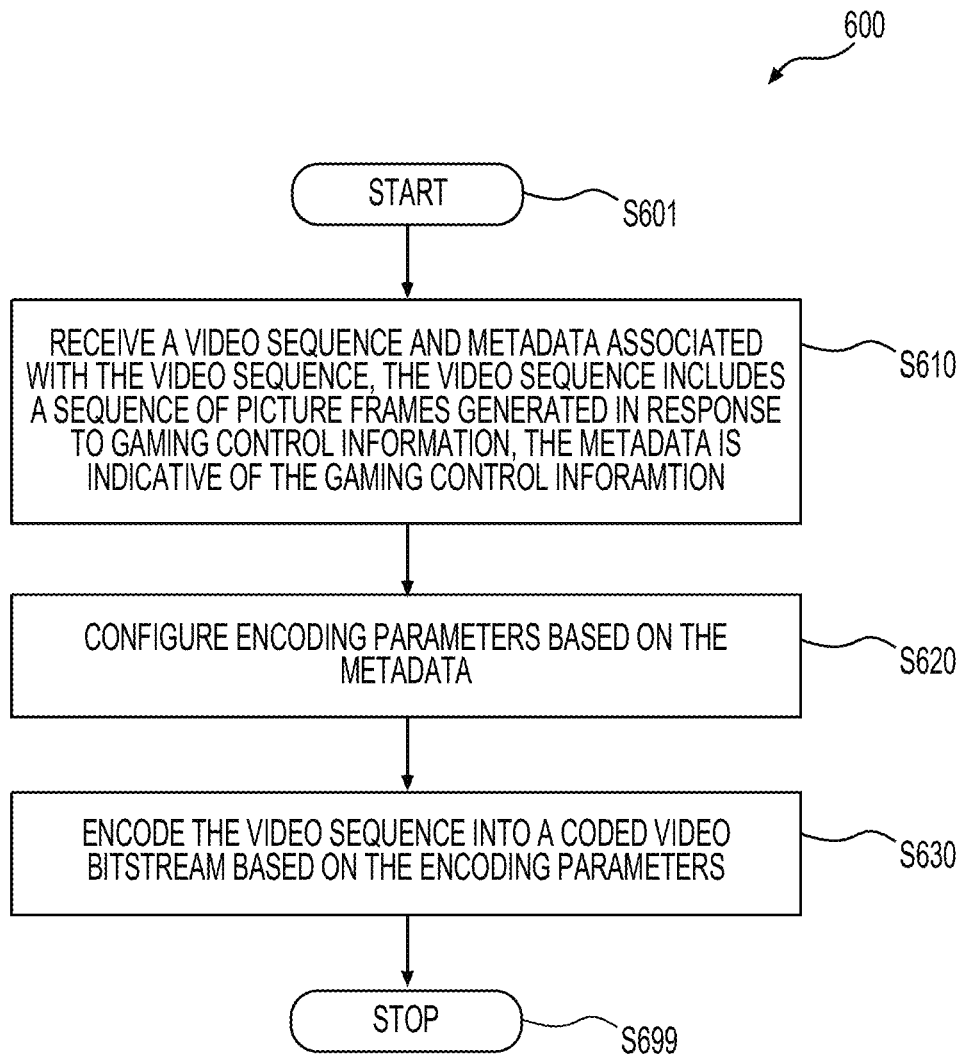
FIG. 6 shows a flow chart outlining a process example according to an embodiment of the disclosure.

FIG. 6 shows a flow chart outlining a process (600) according to an embodiment of the disclosure. The process (600) can be used to encode a video sequence in a cloud gaming system, such as the cloud gaming system (100), the cloud gaming system (300), and the like. In various embodiments, the process (600) is executed by processing circuitry, such as the processing circuit (120) in the server (110), the processing circuit (320) in the server (310), the video encoder (130), the video encoder (330), the video encoder (430), and the like. In some embodiments, the process (600) is implemented in software instructions, thus when the processing circuitry executes the software instructions, the processing circuitry performs the process (600). The process starts at (S601) and proceeds to (S610).

At (S610), a video sequence and metadata associated with the video sequence are received. The video sequence includes a sequence of picture frames generated in response to gaming control information. The metadata is determined based on the gaming control information and is indicative of the gaming control information. In an example, a game engine, such as the game engine (325) generates game contents, such as video contents, audio contents based on game control information, such as game scene control information, user information, and the like. The video contents can be generated as a video sequence that includes a sequence of picture frames. Further, metadata associated with the video sequence can be identified based on the gaming control information. The video sequence and the metadata can be provided to a video encoder, such as the video encoder (330). The video encoder (330) receives the video sequence and the metadata associated with the video sequence.

According to an aspect of the disclosure, the metadata can be any suitable information that can assist encoding, such as camera information, color information, illumination information, motion information, view information, overlay information, user control information, and the like.

In some embodiments, a signal is received over a network and the signal carries user control information that is captured by a remote user input device, such as the user input device (369). The video sequence can be generated in response to the user control information. In some examples, the metadata can include motion information that is identified based on the user control information and game scene information. In an example, the motion information includes a global motion of a gaming scene. In another example, the motion information includes a local motion of an object in a bounding box within the gaming scene.

At (S620), encoding parameters are configured based on the metadata. In an example, a motion model for encoding the video sequence is determined based on the metadata that is indicative of the gaming control information. The motion model can be one of an affine model, a perspective model, a rotation model, and a zooming model in some examples.

At (S630), the video sequence is encoded into a coded video bitstream based on the encoding parameters. The coded video bitstream can be transmitted, via a network, to a destination device, such as the client device (360). In some embodiments, the metadata is also transmitted to the destination device to assist decoding the coded video bitstream at the destination device. In an embodiment, the metadata is transmitted in a SEI message along with the coded video bitstream. In another embodiment, the metadata includes overlay content. The overlay content can be encoded into an overlay content bitstream. The overlay content bitstream and the coded video bitstream can be multiplexed into a single output bitstream. The single output bitstream can be transmitted, via the network, to the destination device. Then, the process proceeds to (S699) and terminates.

Figure 7:
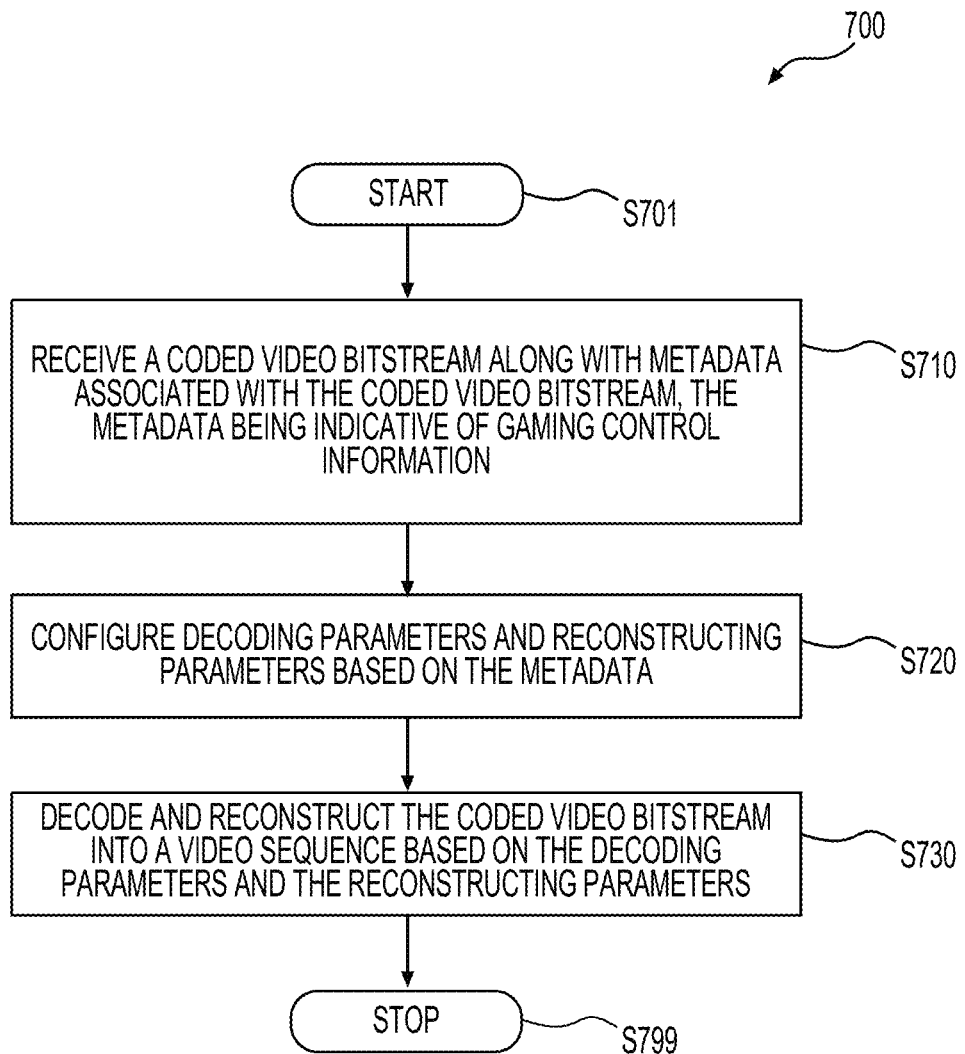
FIG. 7 shows a flow chart outlining another process example according to an embodiment of the disclosure.

FIG. 7 shows a flow chart outlining a process (700) according to an embodiment of the disclosure. The process (700) can be used to decode a video sequence in a cloud gaming system, such as the cloud gaming system (100), the cloud gaming system (300), and the like. In various embodiments, the process (700) is executed by processing circuitry, such as the processing circuit (170), the processing circuit (370), the video decoder (180), the video decoder (380), the video decoder (480), and the like. In some embodiments, the process (700) is implemented in software instructions, thus when the processing circuitry executes the software instructions, the processing circuitry performs the process (700). The process starts at (S701) and proceeds to (S710).

At (S710), a coded video bitstream is received along with metadata associated with the coded video bitstream. The metadata is indicative of gaming control information.

At (S720), decoding parameters and reconstructing parameters are determined based on the metadata.

At (S730), the coded video bitstream is decoded based on the decoding parameters and a video sequence is reconstructed based on the reconstructing parameters. Then, the process proceeds to (S799) and terminates.

In some embodiments, an input bitstream can be de-multiplexed into the coded video bitstream and an overlay content bitstream. The overlay content bitstream can be separately decoded (e.g., by a different decoder) to generate the overlay content. Then, the video sequence can be reconstructed with the overlay content.

The techniques described above, can be implemented as computer software using computer-readable instructions and physically stored in one or more computer-readable media. For example, FIG. 8 shows a computer system (800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
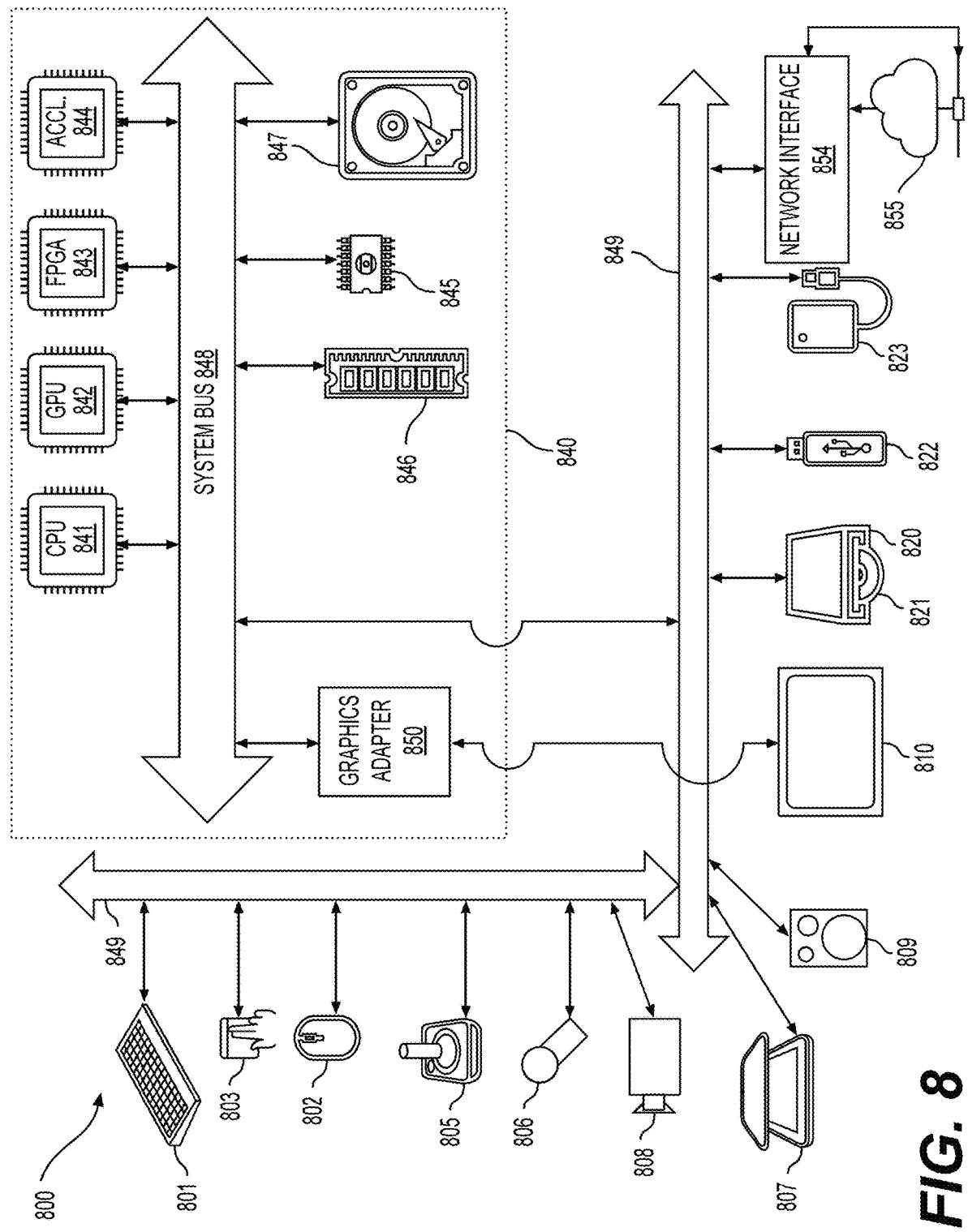
FIG. 8 is a schematic illustration of a computer system in accordance with an embodiment.

The components shown in FIG. 8 for computer system (800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (800).

Computer system (800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (801), mouse (802), trackpad (803), touch screen (810), data-glove (not shown), joystick (805), microphone (806), scanner (807), camera (808).

Computer system (800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (810), data-glove (not shown), or joystick (805), but there can also be tactile feedback devices that do not serve as input devices), audio output devices (such as: speakers (809), headphones (not depicted)), visual output devices (such as screens (810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (800) can also include human accessible storage devices and their associated media such as optical media including CD/DVD ROM/RW (820) with CD/DVD or the like media (821), thumb-drive (822), removable hard drive or solid state drive (823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (800) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (849) (such as, for example USB ports of the computer system (800)); others are commonly integrated into the core of the computer system (800) by attachment to a system bus as described below (for example Ethernet interface into a PC computer system or cellular network interface into a smartphone computer system). Using any of these networks, computer system (800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (840) of the computer system (800).

The core (840) can include one or more Central Processing Units (CPU) (841), Graphics Processing Units (GPU) (842), specialized programmable processing units in the form of Field Programmable Gate Areas (FPGA) (843), hardware accelerators for certain tasks (844), and so forth. These devices, along with Read-only memory (ROM) (845), Random-access memory (846), internal mass storage such as internal non-user accessible hard drives, SSDs, and the like (847), may be connected through a system bus (848). In some computer systems, the system bus (848) can be accessible in the form of one or more physical plugs to enable extensions by additional CPUs, GPU, and the like. The peripheral devices can be attached either directly to the core's system bus (848), or through a peripheral bus (849). Architectures for a peripheral bus include PCI, USB, and the like.

CPUs (841), GPUs (842), FPGAs (843), and accelerators (844) can execute certain instructions that, in combination, can make up the aforementioned computer code. That computer code can be stored in ROM (845) or RAM (846). Transitional data can be also be stored in RAM (846), whereas permanent data can be stored for example, in the internal mass storage (847). Fast storage and retrieve to any of the memory devices can be enabled through the use of cache memory, that can be closely associated with one or more CPU (841), GPU (842), mass storage (847), ROM (845), RAM (846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (800), and specifically the core (840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (840) that are of non-transitory nature, such as core-internal mass storage (847) or ROM (845). The software implementing various embodiments of the present disclosure can be stored in such devices and executed by core (840). A computer-readable medium can include one or more memory devices or chips, according to particular needs. The software can cause the core (840) and specifically the processors therein (including CPU, GPU, FPGA, and the like) to execute particular processes or particular parts of particular processes described herein, including defining data structures stored in RAM (846) and modifying such data structures according to the processes defined by the software. In addition or as an alternative, the computer system can provide functionality as a result of logic hardwired or otherwise embodied in a circuit (for example: accelerator (844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for cloud gaming, comprising:
receiving, by a processor, a video sequence and metadata associated with the video sequence, the video sequence including a sequence of picture frames generated in response to gaming control information, and the metadata being determined based on the gaming control information;
determining motion information of at least one of a global motion of a gaming scene and a local motion of an object in a bounding box within the gaming scene based on the metadata;
configuring, by the processor, encoding parameters based on the determined motion information of the at least one of the global motion of the gaming scene and the local motion of the object in the bounding box within the gaming scene; and
encoding, by the processor, the video sequence into a coded video bitstream, based on the encoding parameters.

2. The method of claim 1, wherein the metadata comprises at least one of camera information, color information, illumination information, the motion information, view information, overlay information, user control information.

3. The method of claim 1, further comprising:
receiving, over a network, a signal carrying user control information; and
generating the video sequence in response to the user control information.

4. The method of claim 1, wherein
the motion information of the at least one of the global motion of the gaming scene and the local motion of the object in the bounding box within the gaming scene is included in the metadata and based on gaming scene control information and user control information.

5. The method of claim 1, further comprising:
determining a motion model for encoding the video sequence based on the metadata.

6. The method of claim 5, wherein the motion model includes at least one of an affine model, a perspective model, a rotation model, and a zooming model.

7. The method of claim 1, further comprising:
transmitting, via a network, the metadata to a destination device of the coded video bitstream.

8. The method of claim 7, further comprising:
transmitting the metadata in a supplemental enhancement information (SEI) message along with the coded video bitstream.

9. The method of claim 7, wherein the metadata includes overlay content, and the method further comprises:
encoding the overlay content into an overlay content bitstream; and
multiplexing the coded video bitstream and the overlay content bitstream into an output bitstream; and
transmitting the output bitstream.

10. An apparatus for cloud gaming, comprising:
processing circuitry configured to:
receive a video sequence and metadata associated with the video sequence, the video sequence including a sequence of picture frames generated in response to gaming control information, and the metadata being determined based on the gaming control information;
determine motion information of at least one of a global motion of a gaming scene and a local motion of an object in a bounding box within the gaming scene based on the metadata;
configure encoding parameters based on the determined motion information of the at least one of the global motion of the gaming scene and the local motion of the object in the bounding box within the gaming scene; and
encode the video sequence into a coded video bitstream, based on the encoding parameters.

11. The apparatus of claim 10, wherein the metadata comprises at least one of camera information, color information, illumination information, the motion information, view information, overlay information, user control information.

12. The apparatus of claim 10, wherein the processing circuitry is configured to:
receive, over a network, a signal carrying user control information; and
generate the video sequence in response to the user control information.

13. The apparatus of claim 10, wherein
the motion information of the at least one of the global motion of the gaming scene and the local motion of the object in the bounding box within the gaming scene is included in the metadata and based on gaming scene control information and user control information.

14. The apparatus of claim 10, wherein the processing circuitry is configured to:
determine a motion model for encoding the video sequence based on the metadata.

15. The apparatus of claim 14, wherein the motion model includes at least one of an affine model, a perspective model, a rotation model, and a zooming model.

16. The apparatus of claim 10, wherein the processing circuitry is configured to:
transmit, via interface circuitry and a network, the metadata to a destination device of the coded video bitstream.

17. The apparatus of claim 16, wherein the processing circuitry is configured to:
transmit the metadata in a supplemental enhancement information (SEI) message along with the coded video bitstream.

18. The apparatus of claim 16, wherein the metadata includes overlay content, and the processing circuitry is configured to:
encode the overlay content into an overlay content bitstream; and
multiplex the coded video bitstream and the overlay content bitstream into an output bitstream; and
transmit the output bitstream.

19. A method for cloud gaming, comprising:
receiving, by a processor, a coded video bitstream along with metadata associated with the coded video bitstream, the metadata being indicative of gaming control information;
determining motion information of at least one of a global motion of a gaming scene and a local motion of an object in a bounding box within the gaming scene based on the metadata;
configuring, by the processor, decoding parameters and reconstructing parameters based on the determined motion information of the at least one of the global motion of the gaming scene and the local motion of the object in the bounding box within the gaming scene; and
decoding and reconstructing, by the processor, the coded video bitstream into a video sequence based on the decoding parameters and reconstructing parameters.

20. The method of claim 19, wherein the metadata includes overlay content and the method further comprises:
de-multiplexing an input bitstream into the coded video bitstream and an overlay content bitstream;
decoding the overlay content bitstream to generate the overlay content; and
reconstructing the video sequence with the overlay content.

* * * * *